(12) United States Patent
Zimmermann

(10) Patent No.: US 9,158,610 B2
(45) Date of Patent: Oct. 13, 2015

(54) FAULT TOLERANCE FOR TASKS USING STAGES TO MANAGE DEPENDENCIES

(71) Applicant: Microsoft Corporation, Redmond, WA (US)

(72) Inventor: Mario Zimmermann, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 290 days.

(21) Appl. No.: 13/712,990

(22) Filed: Dec. 13, 2012

(65) Prior Publication Data

US 2013/0103977 A1     Apr. 25, 2013

Related U.S. Application Data

(63) Continuation-in-part of application No. 13/197,797, filed on Aug. 4, 2011.

(51) Int. Cl.
   *G06F 9/46* (2006.01)
   *G06F 11/07* (2006.01)
   *G06F 11/20* (2006.01)

(52) U.S. Cl.
   CPC .......... *G06F 11/0751* (2013.01); *G06F 11/076* (2013.01); *G06F 11/0709* (2013.01); *G06F 11/0715* (2013.01); *G06F 11/0757* (2013.01); *G06F 11/0793* (2013.01); *G06F 11/2005* (2013.01); *G06F 11/2046* (2013.01); *G06F 11/2025* (2013.01); *G06F 11/2028* (2013.01); *G06F 11/2038* (2013.01)

(58) Field of Classification Search
   None
   See application file for complete search history.

(56) References Cited

U.S. PATENT DOCUMENTS

| | | | |
|---|---|---|---|
| 6,279,119 B1 * | 8/2001 | Bissett et al. | 714/12 |
| 6,330,583 B1 * | 12/2001 | Reiffin | 718/105 |
| 6,865,591 B1 * | 3/2005 | Garg et al. | 709/201 |
| 7,069,298 B2 * | 6/2006 | Zhu et al. | 709/204 |
| 7,137,116 B2 * | 11/2006 | Parkes et al. | 718/102 |
| 7,647,594 B2 * | 1/2010 | Togawa | 718/108 |
| 7,904,907 B2 * | 3/2011 | Jiang et al. | 718/104 |
| 7,930,700 B1 | 4/2011 | Basu et al. | |
| 8,015,564 B1 | 9/2011 | Beyer et al. | |

(Continued)

OTHER PUBLICATIONS

Ahluwalia, et al., "High Availability Design Patterns", Retrieved at <<http://hillside.net/plop/2006/Papers/ACM_Version/High_Availability_Design_Patterns.pdf>>, In the Proceedings of the 2006 conference on Pattern languages of programs, Oct. 21, 2006, pp. 9.

(Continued)

*Primary Examiner* — Emerson Puente
*Assistant Examiner* — Mehran Kamran
(74) *Attorney, Agent, or Firm* — Henry Gabryjelski; Kate Drakos; Micky Minhas

(57) ABSTRACT

A high availability system has an application server communicatively coupled to one or more client machines through a network utilizing stateless communication sessions. The application server manages concurrent execution of tasks on multiple client machines. A task may be dependent on the execution of another task and the dependencies are managed through stages. The application server utilizes a fault tolerance methodology to determine a failure to any one of the components within the system and to perform remedial measures to preserve the integrity of the system.

17 Claims, 10 Drawing Sheets

(56) References Cited

U.S. PATENT DOCUMENTS

| | | | |
|---|---|---|---|
| 8,209,702 B1 | 6/2012 | Roytman et al. | |
| 8,281,313 B1 | 10/2012 | Santos et al. | |
| 2002/0194244 A1* | 12/2002 | Raventos | 709/101 |
| 2003/0065970 A1* | 4/2003 | Kadam | 714/3 |
| 2004/0268355 A1* | 12/2004 | Robin et al. | 718/100 |
| 2005/0268300 A1* | 12/2005 | Lamb et al. | 718/100 |
| 2006/0195821 A1* | 8/2006 | Vanspauwen et al. | 717/124 |
| 2006/0242275 A1* | 10/2006 | Shapiro | 709/220 |
| 2006/0288346 A1 | 12/2006 | Santos et al. | |
| 2007/0101013 A1* | 5/2007 | Howson | 709/231 |
| 2007/0185754 A1 | 8/2007 | Schmidt | |
| 2007/0214457 A1* | 9/2007 | Goyal et al. | 718/101 |
| 2008/0040725 A1 | 2/2008 | Moss | |
| 2008/0066072 A1* | 3/2008 | Yurekli et al. | 718/104 |
| 2008/0155544 A1* | 6/2008 | Soussiel et al. | 718/100 |
| 2008/0255682 A1* | 10/2008 | Zhao et al. | 700/30 |
| 2009/0125359 A1 | 5/2009 | Knapic et al. | |
| 2009/0282413 A1* | 11/2009 | Cialini et al. | 718/102 |
| 2010/0070328 A1 | 3/2010 | Motoyama et al. | |
| 2010/0083253 A1* | 4/2010 | Kushwaha | 718/100 |
| 2010/0211815 A1* | 8/2010 | Mankovskii et al. | 714/2 |
| 2011/0004881 A1 | 1/2011 | Terechko et al. | |
| 2011/0209153 A1 | 8/2011 | Suzuki et al. | |
| 2011/0231817 A1* | 9/2011 | Hadar et al. | 717/120 |
| 2011/0276966 A1* | 11/2011 | Christensen et al. | 718/100 |
| 2012/0137164 A1* | 5/2012 | Uhlig et al. | 714/4.11 |
| 2012/0151486 A1 | 6/2012 | Owen et al. | |
| 2012/0159236 A1* | 6/2012 | Kaminsky | 714/4.12 |
| 2012/0159507 A1 | 6/2012 | Kwon et al. | |

OTHER PUBLICATIONS

Nashville, Tennessee, "Component-Based Fault Tolerance for Distributed Real-Time and Embedded Systems", Retrieved at <<http://etd.library.vanderbilt.edu/available/etd-03302009-084951/unrestricted/thesis-fwolf.pdf>>, May 2009, pp. 70.

Barbosa, Raul, "Layered Fault Tolerance for Distributed Embedded Systems", Retrieved at <<http://eden.dei.uc.pt/~rharbosa/files/RBarbosa-PhDThesis-G5paper.pdf>>, Nov. 2008, pp. 195.

Arlat, et al., "Fault Tolerant Computing", Retrieved at <<http://homepages.laas.fr/deswarte/Publications/98005.pdf>>, Apr. 1, 2012, pp. 97.

Garg, et al., "A Review of Fault Tolerant Checkpointing Protocols for Mobile Computing Systems", Retrieved at <<http://www.ijcaonline.org/volume3/number2/pxc387998.pdf>>, In an International Journal of Computer Applications vol. 3—No. 2, Jun. 2010, pp. 12.

"Using Stages to Handle Dependencies in Parallel Tasks", U.S. Appl. No. 13/197,797, filed Aug. 4, 2011, pp. 24.

Gawand, et al., "Design Patterns to Implement Safety and Fault Tolerance", Retrieved at <<http://www.ijcaonline.org/volume18/number2/pxc3872900.pdf>>, International Journal of Computer Applications (0975-8887), vol. 18—No.2, Mar. 2011, pp. 8.

Kalinsky, David, "Design Patterns for High Availability", Retrieved at <<http://www.embedded.com/design/embedded/4024434/Design-Patterns-for-High-Availability>>, Jul. 31, 2002, pp. 8.

Saridakis, Titos, "A System of Patterns for Fault Tolerance", Retrieved at <<http://hillside.net/europlop/HillsideEurope/Papers/EuroPLoP2002/2002_Saridakis_ASystemOfPatternsForFaultTolerance.pdf>>, In Nokia Research Center, Sep. 27, 2010, pp. 48.

"An Essential Design Pattern for Fault-tolerant Distributed State Sharing. (Recoverable Distributor)", Retrieved at <<http://www.accessmylibrary.com/article-1G1-18838816/essential-design-pattern-fault.html>>, Communications of the ACM, Oct. 1, 1996, pp. 9.

Sudduth, Jr, Jerrry L., "Optimistic Concurrency Control Pattern", Retrieved at <<https://agora.cs.illinois.edu/download/attachments/26574284/Optimistic+Concurrency+Control+Pattern+-+v1.0+-+20091208.pdf>>, Dec. 8, 2009, pp. 10.

* cited by examiner

```
200
  ↓
202  204                                                      206              208
 ┌─────────────────────────────────────────────────────────┐ ┌─────────┐ ┌──────────────────┐
 <Task Name="BVT_Client-BecWebService.xml"                   Stage="001"  MaximumStage="019" />
 <Task Name="BVT_Client-Connector_BVT.xml"                   Stage="001"  MaximumStage="019" />
 <Task Name="BVT_Client-Powershell_ExtendedTests.xml"        Stage="001"  MaximumStage="019" />
 <Task Name="BVT_Client-FederatedIdentity_ExtendedTests.xml" Stage="001"  MaximumStage="019" />
 <Task Name="BVT_AuthZExtendedTests.xml"                     Stage="001"  MaximumStage="001" />
 <Task Name="BVT_Aws.xml"                                    Stage="002"  MaximumStage="002" />
 <Task Name="BVT_ApiExtendedTests.xml"                       Stage="003"  MaximumStage="003" />
 <Task Name="BVT_DSAPIExtendedTests.xml"                     Stage="004"  MaximumStage="004" />
 <Task Name="BVT_IdentityExtendedTest.xml"                   Stage="005"  MaximumStage="005" />
 <Task Name="BVT_WorkflowsExtendedTests.xml"                 Stage="006"  MaximumStage="006" />
 <Task Name="BVT_CompanyManagerExtendedTests.xml"            Stage="007"  MaximumStage="007" />
 <Task Name="BVT_monitoringStxFramework.xml"                 Stage="008"  MaximumStage="008" />
 <Task Name="BVT_MouseConsole_AdminExtTests.xml"             Stage="009"  MaximumStage="009" />
 ...
 <Task Name="BVT_SyncServiceExtendedTests.xml"               Stage="011"  MaximumStage="011" />
 <Task Name="BVT_SyncToADExtendedTests.xml"                  Stage="012"  MaximumStage="012" />
 <Task Name="BVT_SyncFromExchange_ExtendedTests.xml"         Stage="013"  MaximumStage="013" />
 <Task Name="BVT_ProvisioningTests.xml"                      Stage="014"  MaximumStage="014" />
 <Task Name="BVT_PropagationTasks.xml"                       Stage="016"  MaximumStage="016" />
 <Task Name="BVT_PropagationServiceExtendedTesct.xml"        Stage="017"  MaximumStage="017" />
 ...
 <Task Name="BVT_SubscriptionExtendedTests.xml"              Stage="020"  MaximumStage="020" />
 <Task Name="UnlistedBVTTasks"                               Stage="022"  MaximumStage="120" />
```

*FIG. 2*

FAULT TOLERANCE FOR TASKS USING STAGES TO MANAGE DEPENDENCIES

CROSS-REFERENCE TO RELATED APPLICATION

This application is a continuation-in-part of U.S. patent application Ser. No. 13/197,797 filed on Aug. 4, 2011.

BACKGROUND

A system administrator or developer in a data processing system may often be required to execute a large list of tasks or processes. The easiest way to schedule the list of tasks is to run them sequentially. However, sequential execution of each task may not fully utilize the system's resources and may increase the completion time for all the tasks to execute. An alternative to sequential execution is to execute each task in parallel with the other tasks. Although, running the tasks in parallel may be more efficient, it may also be more complicated due to dependencies that exist between the various tasks in the list. For example, some tasks may temporarily change the topology of the system in such a way that other tasks running in parallel may fail. Other tasks may depend upon the output or changes made to data generated by previously executed tasks in the list. However, certain tasks may not complete or fail thereby preventing subsequent dependent tasks from being executed. Yet other tasks may have dependencies on instructions from other tasks being executed in a particular order.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A high-availability data processing system has an application server and multiple client machines that communicate through a network. The system employs an infrastructure that can recover from failures seamlessly, with no downtime and no required action from a developer. The system automatically detects failures from any component within the system and takes an automatic action after a detected failure to ensure the correct behavior of the system.

The application server manages the execution of tasks on the client machines so that multiple tasks execute concurrently. The dependencies between the tasks are controlled through the use of stages. Each task is associated with a stage that uniquely identifies a task and a maximum stage that identifies the stages that can execute concurrently with the task. The application server controls and tracks execution of the tasks on the multiple client machines in the order specified by the stages.

The application server interacts with one or more client machines through a sequence of stateless communication sessions. The application server utilizes a server fault tolerance module to determine when a client machine or the network has encountered a failure and initiates an appropriate measure to ensure that each task executes properly. The client machine utilizes a client fault tolerance module to determine when the application server or the network has failed and the appropriate measures to employ.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 2 is a listing showing a portion of a sample task definition list, according to embodiments described herein;

DETAILED DESCRIPTION

Figure 1:
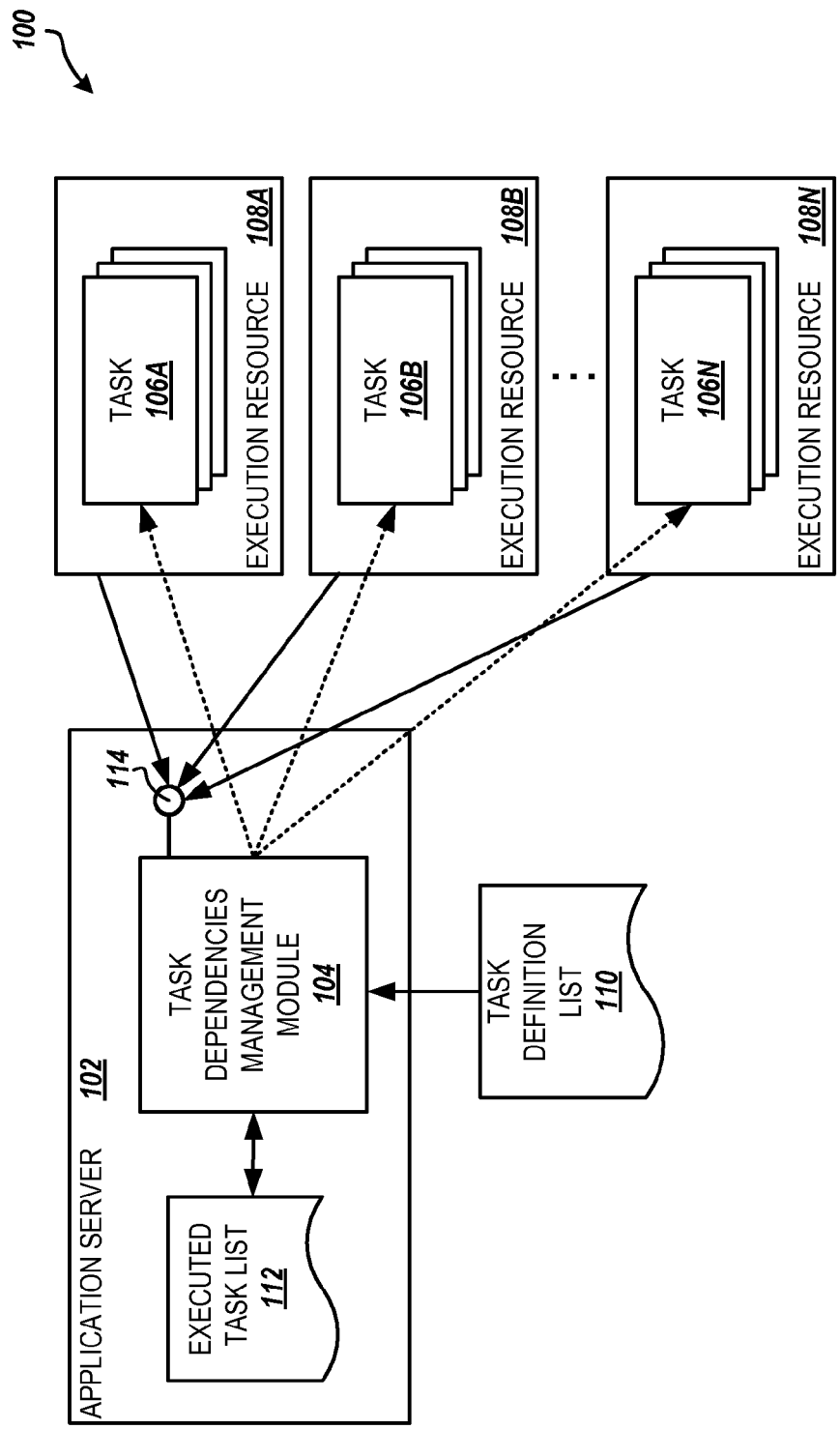
FIG. 1 is a block diagram showing aspects of an illustrative system for using stages to handle dependencies in parallel tasks.

Various embodiments pertain to a technology for utilizing a fault tolerance methodology in a high-availability data processing system that executes tasks concurrently using stages. The high-availability data processing system utilizes an application server to manage the concurrent execution of tasks on multiple client machines. The application server and the client machines communicate through stateless communication sessions over a network. The fault tolerance methodology evaluates the various components of the system that are subject to failure, such as the application server, the client machines, and the network, and automatically takes actions to reduce downtime of the system, identify inevitable faults, and recover the infrastructure to a stable operational state.

The fault tolerance methodology utilizes redundancy, identifies failures in the system, and initiates actions to be taken when a failure is detected. Redundancy may be achieved based on cost considerations. In one or more embodiments, the system may utilize redundant machines for the application server and for each of the client machines in order to improve availability and to reduce the chance of failures. The redundant machines across multiple datacenters would also ensure resilience against network failures.

In one or more embodiments, redundancy may be implemented on the application server only. The infrastructure may utilize a backup server to support the application server in the event there is a failure to the application server. However, the infrastructure may utilize more cost effective means to implement redundancy for the application server such as, without limitation, a file system share, and the like. For example, if the application server was implemented as an SQL server, a file system share may be utilized as a backup source. The file system would not be affected by the same failure factors that may affect the SQL server, such as incorrect SQL server updates, malicious attacks to an SQL server, erroneous configuration of a network that affects an SQL server port, and the like.

The fault tolerance methodology automatically detects failures in any component of the infrastructure, such as the application server, a client machine and the network. In order for the system to facilitate greater scalability, the client machines are transparent to the application server and communications between the application server and the client machines are done using a stateless communication protocol. As such, each client machine contacts the application server to request execution of a task and the application server approves or denies execution of the task based on the stages associated with the task and other pending tasks. The client machine updates the application server when a task is completed or when the client machine requests additional time to complete a task.

Failures to a client machine or network may be detected when the application server does not receive requests from one or more of the client machines. In addition, a client machine or network failure may be detected when the application server does not receive a completion message or an additional time request from one or more of the client machines. A client machine may detect a failure to the application server when the client machine does not receive a response from a request after several attempts in sending the request. In this situation, the client machine contacts the redundant backup and continues its communications with the redundant backup.

The fault tolerance methodology may employ one of several actions when a failure is detected. Based on the type of failure and the nature of the tasks executing, the system may elect a best-effort approach that attempts to execute as many tasks as possible. In some scenarios this approach is advantageous. For instance, when one or more tasks are scheduled to be executed automatically during the night. In this case, ceasing execution of a task after a failure does not save resources. The system may elect to continue execution of as many tasks as possible during the night and mange the effects of the failure at a later time. The system logs data pertaining to the failure in order to analyze the failure at a later time.

In this case, if the application server detects that a client machine does not return a completion message or an additional time request to the application server within an estimated time interval, the application server marks that task as completed and allows other dependent tasks to execute. If a client machine does not receive a response from the application server, the client machine assumes there may be a failure with the application server and proceeds to execute its tasks. In addition, the client machine may contact the backup server to continue communications with the backup server. If the failure is due to a network failure, the task eventually timeouts in the application server and the other dependent tasks execute.

Alternatively, for other tasks, a more conservative approach may be employed. After a detected failure, no other tasks are executed and the state of the system is preserved for analysis. In some situations, running tasks after a failure may be disastrous. For instance, if the tasks at hand pertain to a service update scenario, the system should stop execution of the tasks after a failure has been detected.

If the application server detects a client machine that is not responsive in a timely manner, the application server assumes that the client machine has experienced a failure and blocks all other tasks from running and preserves the state of the system. If a client machine detects a failure when communicating with the application server, the client machine does not proceed executing the task and attempts to communicate with the backup server.

Attention now turns to a more detailed description of the embodiments. First, a detailed description is provided that describes using stages for managing dependencies between tasks executed in parallel. Thereafter, the detailed description describes embodiments pertaining to fault tolerance detection and processing in a system that utilizes stages for managing dependencies between tasks executed concurrently.

Stages for Managing Dependencies Between Tasks

FIG. 1 illustrates a system 100 including several software components for using stages for managing dependencies between tasks executed in parallel, according to embodiments provided herein. The system 100 includes an application server 102. The application server 102 may represent one or more conventional server computers, Web servers, database servers, or network appliances. Alternatively, the application server 102 may represent a user computing device, such as a personal computer ("PC"), a desktop workstation, a laptop, a notebook, a mobile device, a personal digital assistant ("PDA"), and the like. It will be appreciated that the application server 102 may represent any server computers or user computing devices known in the art.

The application server 102 executes a task dependencies management module 104. According to one embodiment, the task dependencies management module 104 is responsible for managing the dependencies in the parallel execution of a number of tasks 106A-106N (referred to herein generally as tasks 106) on a number of execution resources 108A-108N (referred to herein generally as execution resources 108) in the operating environment 100. The task dependencies management module 104 may be implemented as hardware, software, or a combination of the two. The task dependencies management module 104 may be an add-in or component of a batch processing system, a software testing suite, or the like, and may include a number of application program modules and other components executing on the application server 102 and/or other computers or computing devices.

The tasks 106 may include any computer-executable instructions presented in any form, such as software programs, application modules, database scripts, stored procedures, system scripts, testing profiles, and the like. The execution resources 108 may include computing resources for executing the tasks, such as CPUs, virtual machines, execution threads, runtime engines, batch processors, database engines, testing engines, and the like. The execution resources 108 may be provided by the application server 102 and/or one or more other computers or computing devices in the operating environment 100.

According to embodiments, the tasks 106 for parallel execution are defined in a task definition list 110. The task definition list 110 includes a definition of each task 106 to be executed. In one embodiment, the definition of each task 106 in the task definition list 110 comprises a tuple including a task ID identifying the task to be executed, a numeric stage of execution for the task, and a maximum stage indicating a maximum stage of execution that can be executed in parallel with the task. The stage and maximum stage of each task are used by the task dependencies management module 104 to determine which tasks 106 defined in the task definition list 110 may be executed in parallel. The stages and maximum stages defined in the task definition list 110 may be based on the dependencies between the tasks. According to embodiments, each task 106 is assigned to only one stage, and each stage may contain multiple tasks. Tasks 106 assigned to the same stage may run in parallel. In addition, all the tasks 106 assigned to stages that are less than a current maximum stage can also be executed in parallel.

Therefore, the task dependencies management module 104 may determine if a particular task 106 may be executed based on the stage and/or maximum stage of all other pending or running tasks. Particularly, a task A with stage SA and maximum stage MA will be allowed to execute unless another task B is pending or currently running with stage SB less than SA and maximum stage MB less than SA. For example, the task definition list 110 may include four tuples defining four tasks A, B, C, and D, as shown below in Table 1.

TABLE 1

Example Task Definitions (Task ID = A, Stage = 01, Maximum Stage = 05)
(Task ID = B, Stage = 01, Maximum Stage = 01)
(Task ID = C, Stage = 02, Maximum Stage = 02)
(Task ID = D, Stage = 10, Maximum Stage = 10)

According to the task definitions shown in Table 1, task A will be allowed to execute at any time, since no other defined task has a maximum stage less than the stage SA of task A, i.e. MB>=SA, MC>=SA, and MD>=SA. Task B may also execute at any time for the same reasons (MA>=SB, MC>=SB, and MD>=SB). However, task C may only execute after task B is complete, because while the maximum stage MA of task A and the maximum stage MD of task D are both greater than or equal to the stage SC, i.e. MA>=SC and MD>=SC, the maximum stage MB of task B is less than the stage SC. Similarly, task D may only be executed alone, once tasks A, B, and C are complete (MA<SD, MB<SD, MC<SD).

In one embodiment, the task definition list 110 may comprise an extensible markup language ("XML") file with a node defining each task 106. FIG. 2 shows a sample portion of XML 200 from a task definition list 110, according to the embodiment. The XML 200 may include a Task node 202 for each task 106. The task node 202 may include a Name attribute 204 identifying a script, profile, or definition of the associated task 106. The task node 202 also includes a Stage attribute 206 specifying the numeric stage of the task, and a MaximumStage attribute 208 specifying the maximum stage. For example, as shown in FIG. 2, a task 106 identified as "BVT_Client-BecWebService.xml" may have a stage of "001" and a maximum stage of "019." In another embodiment, the Task nodes 202 may be grouped under a parent node, such as a Batch, Group, or Cycle node, with its own name or identifier, and multiple batches or groups may be defined in the task definition list 110.

According to the task definition list 110 defined by the XML 200, all tasks 106 in the listing except "BVT_SubscriptionExtendedTests.xml" and "UnlistedBVTProfiles" would be allowed to run in parallel with the task "BVT_Client-BecWebService.xml." Similarly, the task "BVT_AuthZExtendedTests.xml" is set to execute in stage "001," but only other tasks assigned to stage "001" may run in parallel with the task. Therefore, the task "BVT_Aws.xml," which is set to execute in stage "002," will not be allowed to execute until the "BVT_AuthZExtendedTests.xml" has completed.

In other embodiments, the task definition list 110 may be stored in a delimited flat file, a database table, or any other mechanism known in the art for storing structured data. As further shown in FIG. 2, each task 106 has only one associated entry in the task definition list 110, making the listing easy to maintain and ensuring that the solution scales well. The concept of stages may also allow for increased maintainability as it groups parallel tasks in the same stage. Once the tasks are mapped to stages in the task definition list 110, the task dependencies management module 104 need only read the stage configuration and base the decision whether to run a task on the stage and maximum stage data. There is no extra design effort required from system administrators or developers.

According to one embodiment, the task dependencies management module 104 reads and parses the task definition list 110 in order to provide an indication of whether a particular task is allowed to execute or not upon request for permission to execute the task from an execution resource 108. The task dependencies management module 104 may implement an application programming interface ("API") 114 that is used by the execution resources 108 to determine whether tasks 106 may be executed based on the defined dependencies. When an execution resource 108 becomes available, the execution resource may utilize the API 114 to request permission to execute a particular task 106 from the task dependencies management module 104 by specifying the task ID, such as the task Name attribute 206, for example. The task dependencies management module 104 may utilize the stage and maximum stage defined for the identified task 106 in the task definition list 110, along with knowledge of the completed and currently executing tasks, to determine if the requested task can currently be executed, using a procedure similar to that described below in regard to FIG. 3. The task dependencies management module 104 may then return an indication of whether the specified task 106 may currently be executed to the requesting execution resource 108.

The execution resources 108 may also utilize the API 114 to update the task dependencies management module 104 on the completion of a particular task 106 as well as whether the task completed successfully or not. The task dependencies management module 104 may track the completed tasks 106 and/or the currently executing tasks in an executed task list 112. The executed task list 112 may be utilized to determine whether a particular task 106 may be executed, as described above. The executed task list 112 may be stored in a memory of the application server 102, or may be stored in a database or other storage mechanism accessible by the server.

According to another embodiment, the task dependencies management module 104 reads the task definitions from the task definition list 110 and initiates execution of the defined tasks 106 in stage order on the available execution resources 108 in the environment 100. The task dependencies management module 104 may further monitor execution of the tasks 106 on the execution resources 108 to determine when a task completes and an execution resource becomes available. Upon completion of a task 106 and/or an execution resource 108 becoming available, the task dependencies management module 104 utilizes the stage and maximum stage defined for each task to determine which task(s) may be executed next.

In a further embodiment, the task definition list 110 is parsed and the task definitions contained therein are stored in a table of a database on the application server 102. The executed task list 112 may also be stored in the database, and the functionality required by the task dependencies management module 104 to determine whether a particular task may execute, as will be described below in regard to FIG. 3, may be implemented in stored procedures. The database may expose the API 114 and the stored procedures executed to handle each request made by an execution resource 108, as described above.

Figure 3:
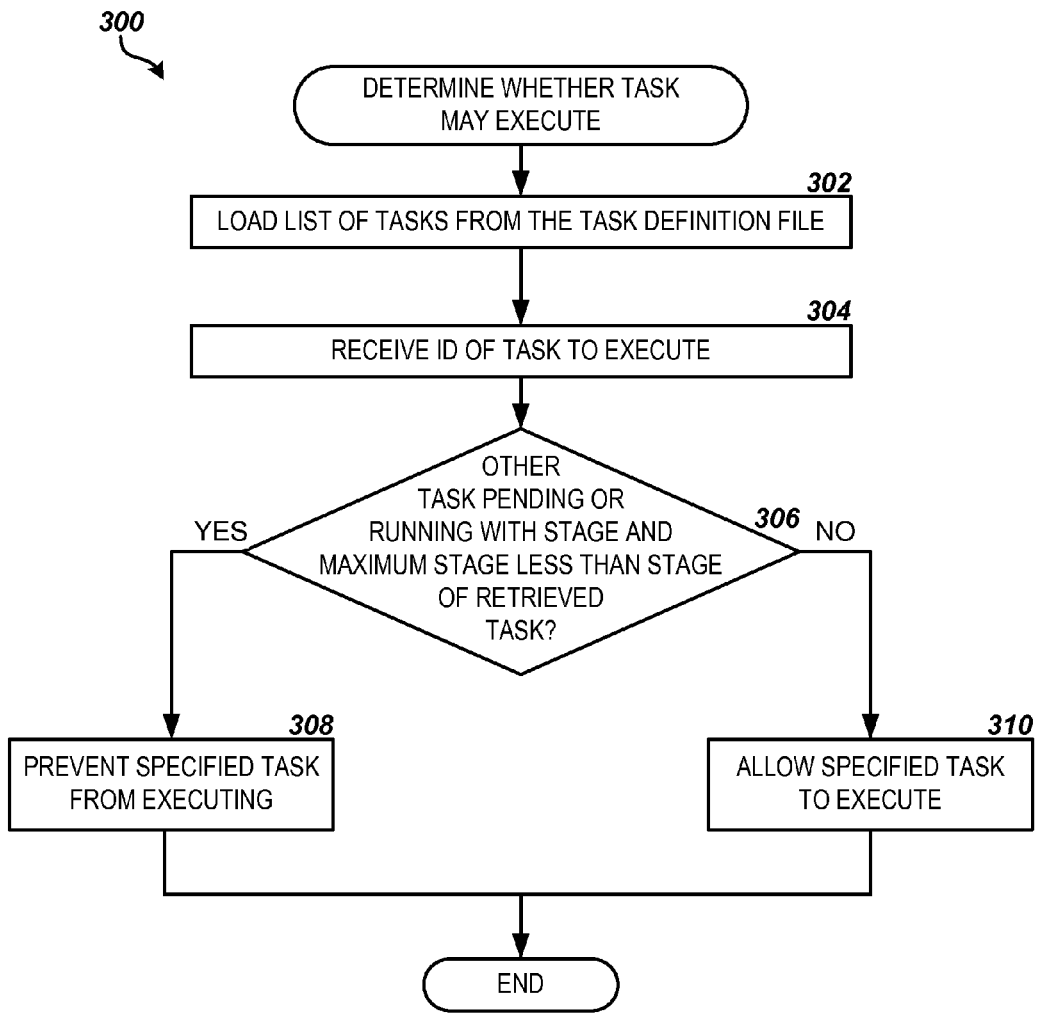
FIG. 3 is a flow diagram showing methods for using stages for managing dependencies between tasks executed in parallel.

Referring now to FIG. 3, additional details will be provided regarding the embodiments presented herein. It should be appreciated that the logical operations described with respect to FIG. 3 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. The operations may also be performed in a different order than described.

FIG. 3 illustrates one routine 300 for determining whether a specified task 106 may be executed based on the stage and maximum stage defined for the tasks in the task definition list 110. According to one embodiment, the routine 300 may be performed by the task dependencies management module 104 executing on the application server 102 and/or other servers or computing devices. It will be appreciated that the routine 300 may also be performed by other modules or components executing on other computing devices, or by any combination of modules, components, and computing devices. As described above, the routine 300 may be performed by the task dependencies management module 104 in response to a request by an execution resource via the API 114 for permission to execute a particular task 106.

The routine 300 begins at operation 302, where the task dependencies management module 104 loads a list of tasks from the task definition list 110. As described above in regard to FIG. 1, the task definition list 110 may comprise one or more tuples defining a task ID, stage, and maximum stage for each task. According to embodiments, the list of tasks parsed from the task definition list 110 may be stored in memory of the application server 102 or in a database table or other storage mechanism accessible by the server. It will be appreciated that the operation 302 to load the list of tasks from the task definition list 110 may only be executed once by the task dependencies management module 104 at the beginning of the execution of a group or batch of tasks defined in the task definition list, instead of upon every request.

From operation 302, the routine 300 proceeds to operation 304, where the task dependencies management module 104 receives the task ID of the task 106 to be executed. For example, an execution resource 108 may utilize the API 114 of the task dependencies management module 104 to request permission to execute a particular task 106. The request may specify a task ID of the task 106, such as the task Name attribute 206 described above in regard to FIG. 2.

The routine 300 then proceeds from operation 304 to operation 306, where the task dependencies management module 104 determines whether the specified task may be executed based on the stage and maximum stage of all other pending or running tasks 106. Particularly, the task dependencies management module 104 determines if any pending or currently running task 106 has a stage or maximum stage that is less than the stage defined for the specified task. If another task B is pending or currently running with a stage SB less than the stage SA of the retrieved task and a maximum stage MB less than SA, the specified task is not allowed to run in parallel with or prior to the other task, and the routine 300 proceeds to operation 304, where the task dependencies management module 104 prevents the specified task from being executed. For example, the task dependencies management module 104 may respond to the requesting execution resource 108 with an indicator indicating that the specified task may not be executed at this time.

However, if no other pending or currently running task 106 has a stage or maximum stage that is less than the stage defined for the specified task, then the routine 300 proceeds from operation 306 to operation 310, where the specified task is allowed to execute. For example, the task dependencies management module 104 may respond to the requesting execution resource 108 with an indicator indicating that the task may be executed. From operations 308 or 310, the routine 300 ends.

In a further embodiment, a client module may execute on a remote computer and manage the execution of the tasks 106 defined in a local list or group of tasks on a subset of the execution resources 108. Upon detecting that an execution resource 108 is available, the client module may determine the next task in the local list of tasks to be executed, and utilize the API 114 of the task dependencies management module 104 to request permission to execute the task, by providing a task ID, for example. The task execution module 104 will utilize the routine 300 described above to determine if the task is allowed to execute based on the stage and maximum stage of the other pending and currently running tasks, as determined from the list of tasks and the executed task list 112.

The task execution module 104 may then respond to the client module with an indicator indicating whether the task may be executed or not. If the task may be executed, then the client module will initiate the task 106 on the available execution resource 108. If the task may not be executed, then the client module will select the next task in the local task list for execution and request permission for execution of that task from the task dependencies management module 104. In another embodiment, the client module may execute on the same application server 102 as the task dependencies management module 104 or may be a component of the task dependencies management module, and the local task list may be the task definition list 116.

Fault Tolerance

Figure 4:
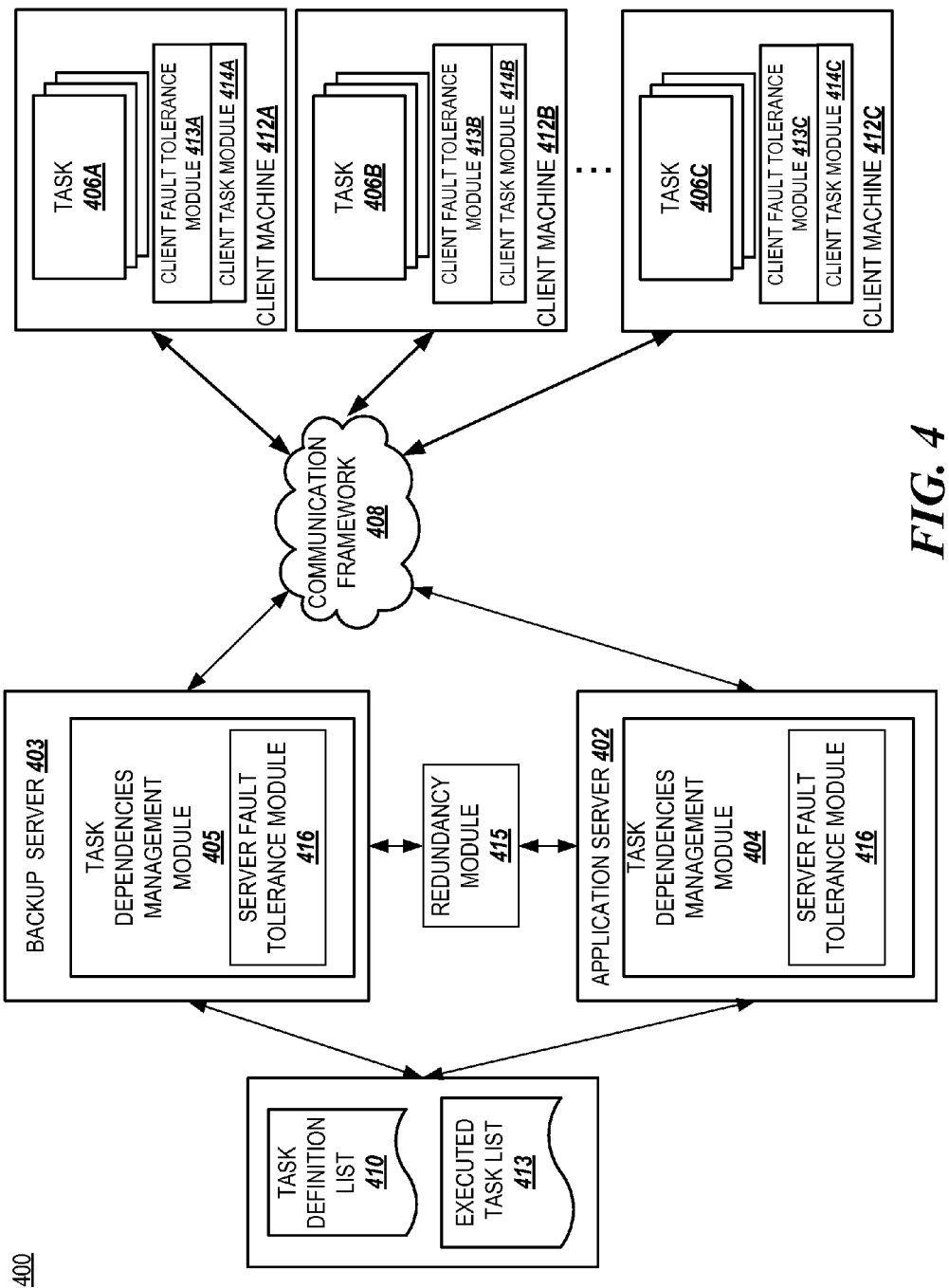
FIG. 4 is a block diagram illustrating an exemplary system for using stages to manage concurrent tasks using fault tolerance mechanisms.

Attention now turns to a description of embodiments employing fault tolerance. FIG. 4 illustrates an exemplary high availability data processing system 400 that executes tasks using stages to manage dependencies among the tasks. The system 400 may include an application server 402, and one or more client machines 412A-412C (referred to herein generally as tasks 412) that are communicatively coupled to the application server 402 through a communications framework 408. In addition, the system 400 includes a backup server 403 communicatively coupled to the application server 402. The application server 402 and the backup server 403 interact with a redundancy module 415.

The system also includes a task definition list 410 and an executed task list 413 that may be accessed by the application server 402 and the backup server 403. Although the system 400 as shown in FIG. 4 has a limited number of elements in a certain topology, it may be appreciated that the system 400 may include more or less elements in alternate topologies as desired for a given implementation.

An application server 402 may include a task dependencies management module 404. The task dependencies management module 404 is responsible for managing the dependencies in the parallel execution of a number of tasks 406A-406N (referred to herein generally as tasks 406) on a number of client machines 412A-412C (referred to herein generally as client machines 412). The task dependencies management module 404 on the application server 402 may include a server fault tolerance module 416. The server fault tolerance module 416 detects network and client machine failures and processes these failures accordingly.

The backup server 403 is a computing device that takes over the processing activities of the application server 402 in the event of a failure to the application server 402. The backup server 403 may be implemented as any type of computing device capable of performing the same operations and functions as the application server. The backup server may be implemented as a file system share, a server, a network access storage device, and so forth.

The backup server 403 may include a task dependencies management module 405 and a redundancy module 415. The task dependencies management module 405 may include a server fault tolerance module 416. The task dependencies management module 405 is similar to the task dependencies management module 404 of the application server 402 so that the backup server 403 is able to continue processing in the same manner as the application server 402 in the event of a failure to the application server 402.

The redundancy module 415 communicates with the backup server 403 and the application server 402 to track the state of the application server 402 in order to continue operations in the event of a failure to the application server 402. The redundancy module 415 may use any of the well-known techniques for implementing redundancy such as checkpoints/restarts, redundant multi-threading, backing up and restoring data, and so forth.

In some embodiments, the redundancy module 415 may be duplicated in both the application server 402 and the backup server 403. The redundancy modules communicate with each other, synchronize the state of the application server 402 and identify the time when the backup server 403 takes over.

In one or more embodiments, the redundancy module 415 may be partitioned into two segments. One segment may be embodied in the application server 402 (e.g., server front end) and another segment may be embodied in the backup server 403. In other embodiments, the redundancy module 415 may be implemented in a separate computing device.

The tasks 406 for execution are defined in a task definition list 410. The task definition list 410 includes a definition of each task 406 to be executed, as described above. An executed task list 413 may be utilized to determine whether a particular task 406 may be executed as described above. The task definition list 410 and the executed task list 413 may be stored in a central repository accessible by both the application server 402 and the backup server 403. By storing the lists in this manner, a current version of these lists may be available to the backup server 403 when the backup server 403 takes over for the failed application server 402.

A client machine 412 may include one or more tasks 406, a client task module 414, and a client fault tolerance module 413. The client task module 414 manages execution of a task 406 on a client machine 412 and interacts with the application server 402 with respect to the scheduling of a task 406. The client fault tolerance module 413 detects failures to the application server and/or network.

In one or more embodiments, the application server 402, the backup server 403, and the client machines 412, may each be implemented as a computing device that may be any type of electronic device capable of executing programmable instructions. The computing device may be implemented as a mobile device, a personal digital assistant, a mobile computing device, a smart phone, a tablet, a cellular telephone, a handheld computer, a server, a server array or server farm, a web server, a network server, an Internet server, a work station, a mini-computer, a mainframe computer, a supercomputer, a network appliance, a web appliance, a distributed computing system, multiprocessor systems, or combination thereof.

In other embodiments, a client machine 412 and the backup server 403 may be implemented as a sequence of computer program instructions, that when executed by a processor, causes the processor to perform methods and/or operations in accordance with a prescribed task. These modules may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The client fault tolerance module 413, the client task module 414, the server fault tolerance module 416, and the redundancy module 415 may be implemented as a sequence of computer program instructions, that when executed by a processor, causes the processor to perform methods and/or operations in accordance with a prescribed task. These modules may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The communications framework 408 facilitates communications between the application server 402 and the client machines 412. The communications framework 408 can embody any type of communications medium, such as wired or wireless networks, utilizing any communication protocol. The communications framework 408 may be implemented as one or more computer networks that operate in accordance with one or more communication protocols (i.e., Ethernet, Internet protocol suite, TCP/IP, 802.11, etc.). The embodiments are not limited in this manner.

Although the system 400 shown in FIG. 4 has a limited number of elements in a certain configuration, it should be appreciated that the system 400 can include more or less elements in alternate configurations. For example, the application server 402 may be arranged as a plurality of server machines. By way of another example, the client machines 412 may be implemented as processes that run within the application server 402. The application server 402 and the client machines 412 may be located within a same physical location and communicatively coupled through a local area network. Alternatively, the application server 402 may reside at one physical location and each client machine 412 may reside in a separate physical location and communicate through the Internet.

Yet in other embodiments, the application server 402 and the client machines 412 may be controlled by the same or different system administrators. For example, the application server 402 may be utilized as part of a service and the client machines 412 may be operated by entities that differ from the entity operating the application server 402. Various configurations are possible and the embodiments are not limited in this manner.

Attention now turns to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

In one or more embodiments, a client machine 412 and the application server 402 communicate by exchanging messages within a session through a stateless communication protocol. A session is a sequence of messages that are exchanged between two devices in accordance with a protocol. In a stateless protocol, a client machine 412 and the application server 402 communicate without saving any state information. State information may consist of protocol parameters, user or client machine identifiers, session identifiers, authentication status, and the like. For example, the hypertext transfer protocol (HTTP) is a stateless protocol. Each request and response is treated as an independent communication that does not rely on information from a previous communication.

In one or more embodiments, the application server 402 operates as a stateless server. The application server 402 does not save any state information from previous requests. The application server 402 responds to each request without tracking state information of the client machine making the request. In this manner, the application server 402 is not constrained to communicating with a predetermined number of client machines since the application server 402 does not have to maintain the resources needed to save each client machine's state information.

Figure 5:
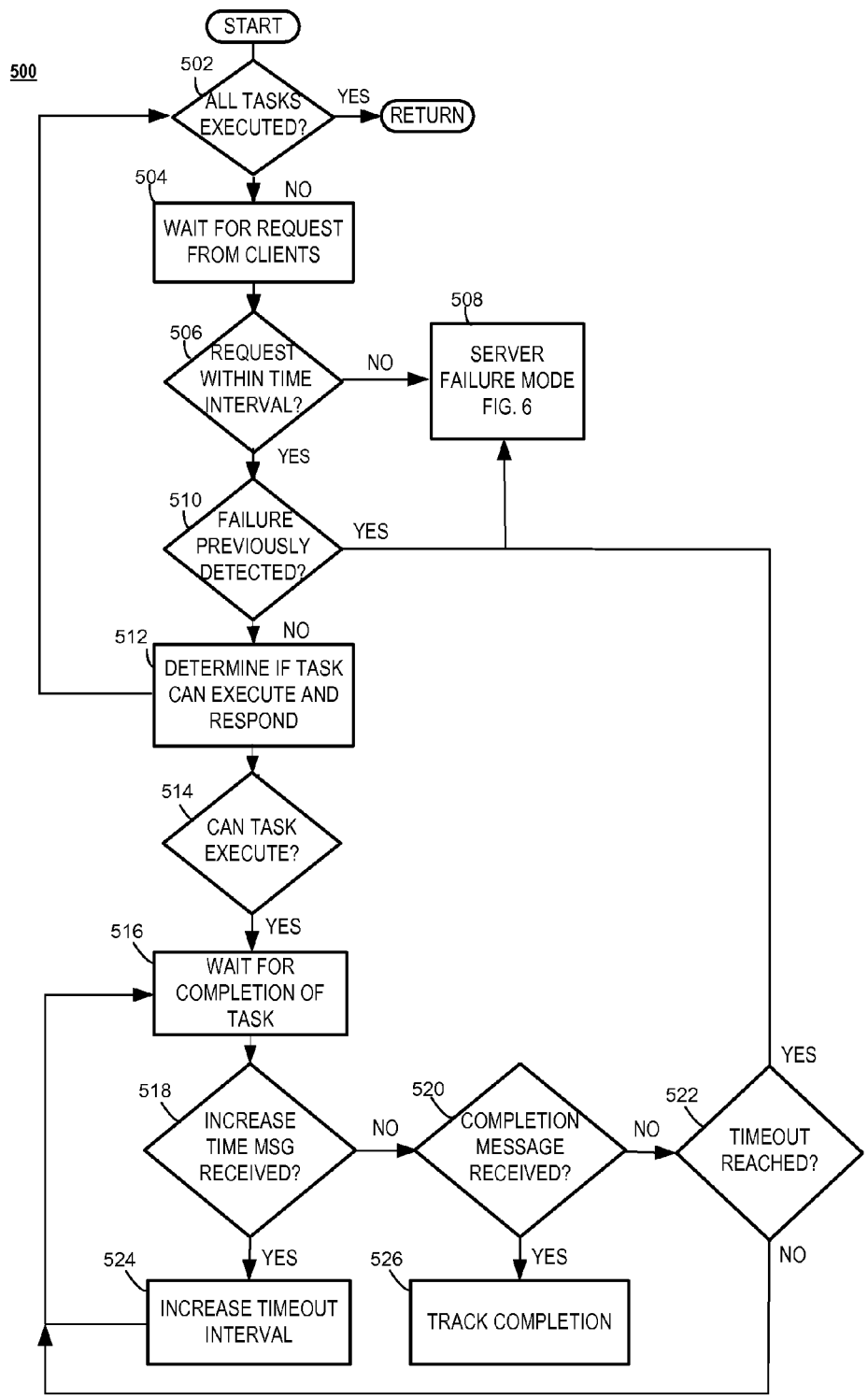
FIG. 5 is a flow diagram illustrating of an exemplary method utilized by an application server.

FIG. 5 illustrates a flow diagram illustrating an exemplary method 500 used by the application server 402 and the backup server 403 when the backup server 403 operates in the capacity of the application server 402. The method 500 may be utilized by the server fault tolerance module 416. Initially, the application server 402 checks if all tasks have been completed (block 502). If there are no outstanding tasks to execute (block 502—yes), then the application server 402 returns to perform other processing.

Otherwise (block 502—no), the application server 402 waits for requests from client machines (block 504). If the application server 402 does not receive task requests within a time interval (block 506—no), then the application server 402 detects a network failure and the application server 402 enters into server failure mode (block 508). A network failure is presumed to be the cause of the failure since no tasks have been received from any client machine.

Otherwise, if a request to execute a task was received (block 506—yes), then the application server checks if a previous failure was detected (block 510). If a previous failure was detected (block 510—yes), then the application server 402 enters into server failure mode (block 508). Otherwise, if there were no previous failures (block 510—no), then the application server 402 determines if the task can execute based on the dependency of the stages as noted above with respect to FIG. 3 (block 512). If the task cannot execute, then the application server 402 responds to the client machine informing the client machine that the task is not ready to execute (block 512). This may be due to a dependent stage that has not completed execution.

If the requested task can execute (block 514—yes), then the application server 402 waits for completion of the task (block 516). At the estimated completion time, the application server checks if a increase time message and completion message was received from the task. If a message have been received by the client machine previously indicating that the task will complete later (block 518—yes), then the timeout interval is increased (block 524) and the process proceed to wait for completion of the task (block 516).

If an increased time message has not been received (block 518—no), then the application server 402 checks if a task completion message has been received (block 520). If a task completion message has not been received (block 520—no) and a timeout interval has been reached (block 522—yes), then the application server 402 enters into server failure mode (block 508). If a task completion message has been received (block 520—yes), then the application server 402 tracks completion of the task and updates the executed task list accordingly (block 526). If a task completion message has not been received (block 520—no) and the timeout interval has not been reached (block 522—no), then the process proceeds to wait for completion of the task (block 516).

Figure 6:
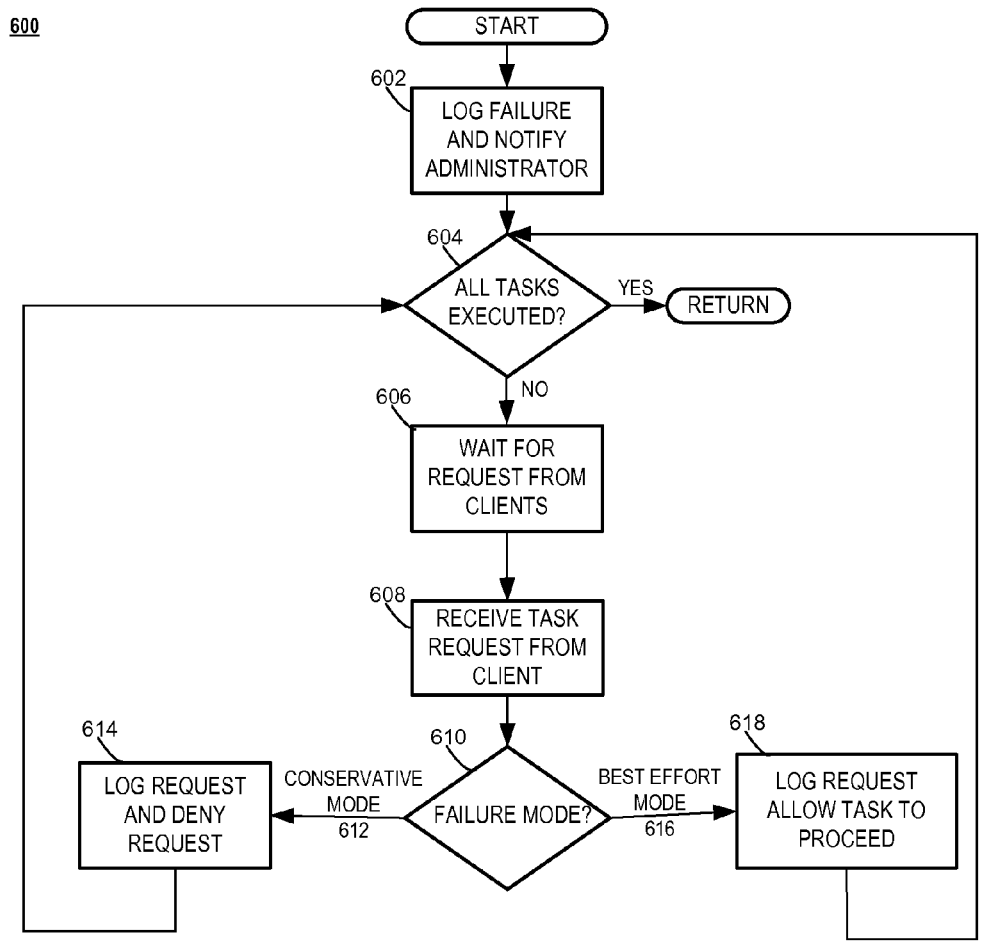
FIG. 6 is a flow diagram illustrating an exemplary method utilized by an application server in server failure mode.

FIG. 6 illustrates a flow diagram illustrating an exemplary method 600 of the application server 402 executing in server failure mode. The method 600 may be implemented by the server fault tolerance module 416. In server failure mode, the application server detects a failure and acts to continue processing in the best manner under the circumstances. The failure may be attributable to a network failure or a client machine failure. The application server logs data pertaining to the failure and notifies an administrator (block 602).

If all tasks have been executed (block 604—yes), then the application server returns to other processing. If there are remaining tasks to execute (block 604—no), then the application server waits for a client request (block 606). When a client request is received (block 608), the application server processes the request in accordance with an appropriate failure mode (block 610). For the best effort mode 616 (block 610—yes), the request is logged and the application server gives the client machine permission to execute the task (block 618). For the conservative mode 612 (block 612—no), the application server logs the request and then denies the client machine permission to execute the task (block 614).

Figure 7:
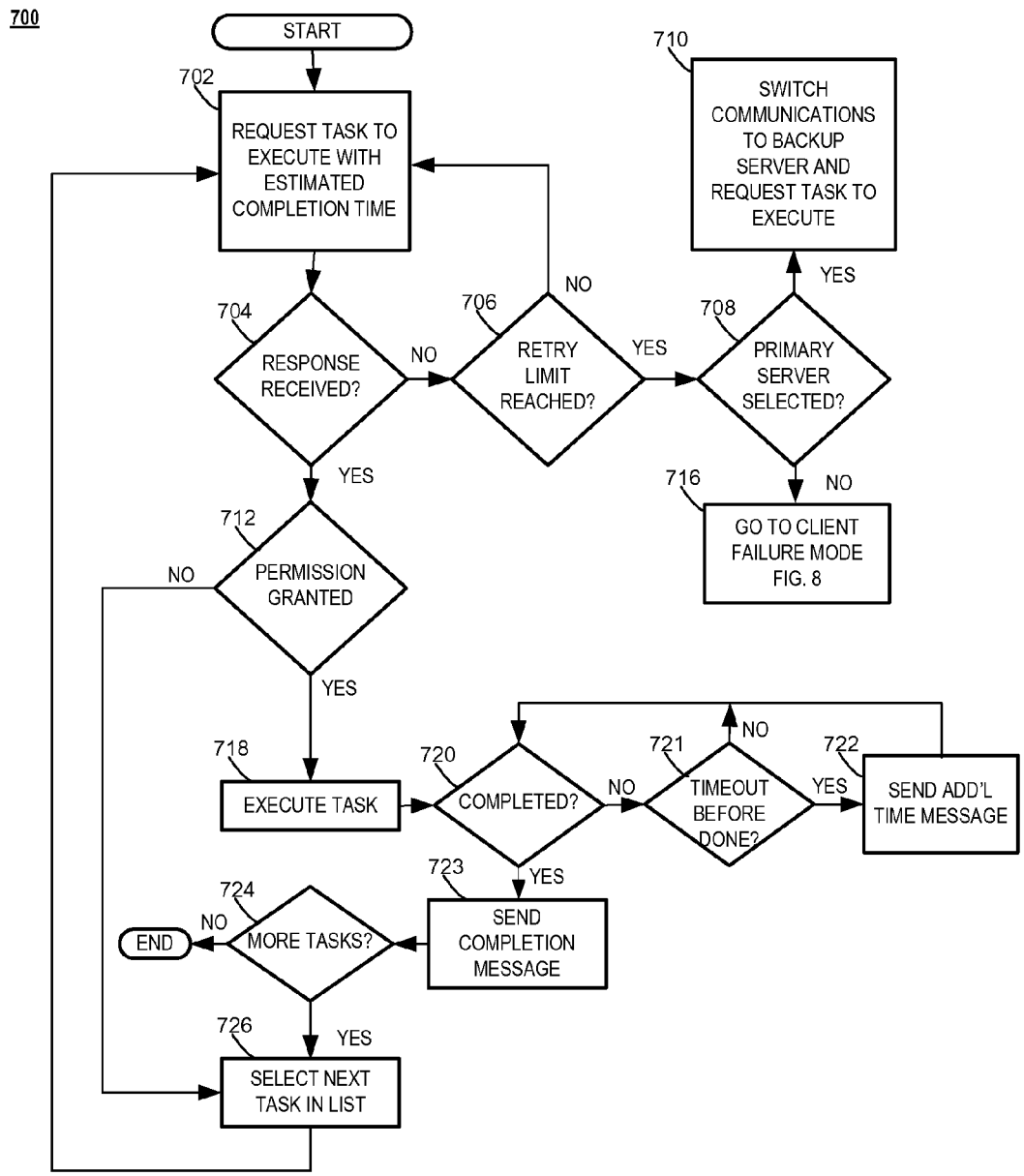
FIG. 7 is a flow diagram illustrating an exemplary method utilized by a client machine.

FIG. 7 illustrates a flow diagram illustrating an exemplary method 700 used by a client fault tolerance module 413 in a client machine 412. A client machine may send the application server a request to execute a task with an estimated completion time (block 702). The client machine may receive a response from the application server (block 704) granting the client machine permission (block 712—yes) to execute the task (block 718).

If the client machine does not receive a response from the application server (block 704—no), then the client machine re-transmits the request to the application server (block 706—no). If the number of retries has been reached (block 706—yes) and the application server is acting as the primary server (block 708—yes), then the client machine detects a server failure and commences communications with the backup server to request execution of the task (block 710). Otherwise, if the backup server is acting on behalf of the application server, (block 708—no), then the client machine goes into client failure mode (block 716).

If the task has been granted permission to execute (block 712—yes), then the client machine executes the task (block 718). When the task completes (block 720—yes), a completion message is sent to the application server (block 723). If the task has not finished (block 720—no) and the estimated completion time expires before the task completes (block 721—yes), then the client machine sends the application server an additional time message indicating an updated estimated completion time (block 722). It the task has not finished (block 720—no) and the estimated completion time did not expire (block 721—no), then the process waits until the task completes (block 720).

When the task completes processing on the client machine (block 720—yes), then a completion message is sent to the application server (block 723). If the client machine has more tasks to execute (block 724—yes), then the next task is selected from the task list (block 726) and the process continues (bock 702). Otherwise, if the client machine does not have more tasks to execute (block 724—no), processing terminates.

Figure 8:
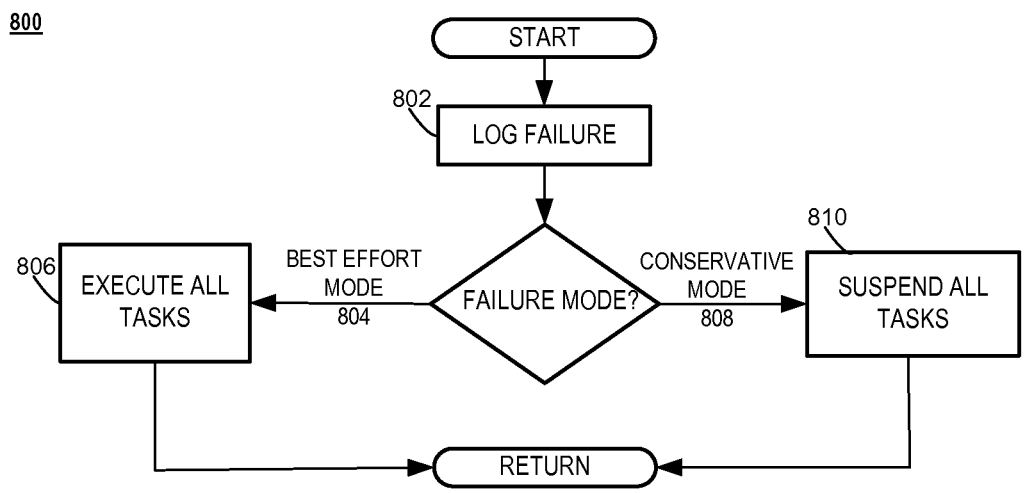
FIG. 8 is a block diagram illustrating an exemplary method utilized by a client machine when in client failure mode.

FIG. 8 illustrates an exemplary method employed by the client fault tolerance module in client failure mode. When a client machine detects a failure to the application server or the network, the client machine logs all data regarding the failure (block 802). In best effort mode 804, the client machine continues executing the tasks (block 806). In conservative mode 808, the client machine suspends execution of the tasks (block 810).

Figure 9:
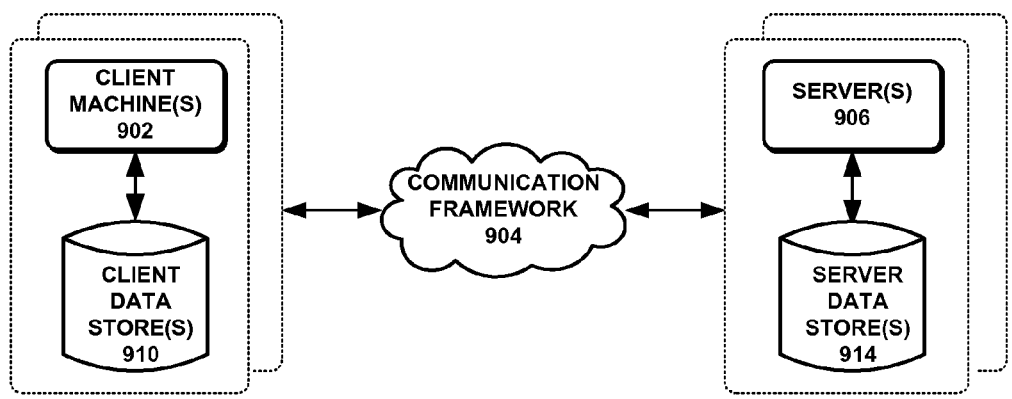
FIG. 9 is an exemplary operating environment.

Attention now turns to a discussion of an exemplary operating environment. Referring now to FIG. 9, there is shown a schematic block diagram of an exemplary operating environment 900. It should be noted that the operating environment 900 is exemplary and is not intended to suggest any limitation as to the functionality of the embodiments.

The embodiments may be applied to an operating environment 900 having one or clients 902 communicatively coupled through a communications framework 904 with one or more servers 906. Each client 902 may be communicatively coupled to one or more client data stores 910. Each server 906 may be communicatively coupled to one or more server data stores 914.

A client 902 may be embodied as a hardware device, a software module, or a combination thereof. The client 902 may be any type of electronic device, such as, without limitation, a mobile device, a personal digital assistant, a mobile computing device, a smart phone, a cellular telephone, tablet, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The client 902 may also be embodied as a software module having instructions that execute in a single execution path, multiple concurrent execution paths (e.g., thread, process, etc.), or in any other manner.

Each server 906 may be communicatively coupled to other servers through any type of communication interconnect, such as a LAN, WAN, and so forth. A server 906 may be embodied as a hardware device, a software module, or as a combination thereof. The server 906 may be any type of electronic device capable of executing programmable instructions such as, without limitation, a mobile device, a personal digital assistant, a mobile computing device, tablet, a smart phone, a cellular telephone, a handheld computer, a server, a server array or server farm, a blade server, a web server, a network server, an Internet server, a work station, a mini-computer, a mainframe computer, a supercomputer, a network appliance, a web appliance, a distributed computing system, multiprocessor systems, or combination thereof. The server 906 may also be embodied as a software module having instructions that execute in a single execution path, multiple concurrent execution paths (e.g., thread, process, etc.), or in any other manner.

The communications framework 904 facilitates communications between the clients 902 and the servers 906. The communications framework 904 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators).

Figure 10:
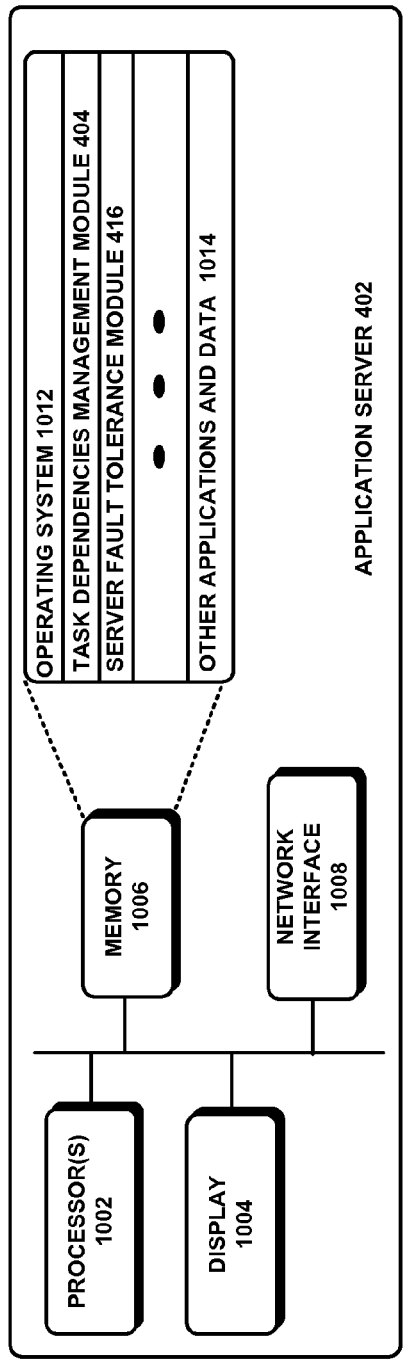
FIG. 10 is a block diagram illustrating an exemplary application server.

Attention now turns to a discussion of an exemplary application server 402 and client machine 412. FIG. 10 illustrates a block diagram of an exemplary application server 402. The application server 402 may have one or more processors 1002, a display 1004, a memory 1006, and a network interface 1008. A processor 1002 may be any commercially available processor and may include dual microprocessors and multi-processor architectures. The display 1004 may be any visual display unit and may include a display having a touch screen embedded within the display. The network interface 1008 facilitates wired or wireless communications between the applications server 1002 and a communications framework.

The memory 1006 may be any computer-readable storage media that may store executable procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, flash memory drive, optical storage, DVD, CD, floppy disk drive, and the like. The memory 1006 may also include one or more external storage devices or remotely located storage devices. The memory may 1006 contain instructions and data as follows:

an operating system 1012;
    a task dependencies management module 404;
    a server fault tolerance module 416; and
    various other applications and data 1018.

Figure 11:
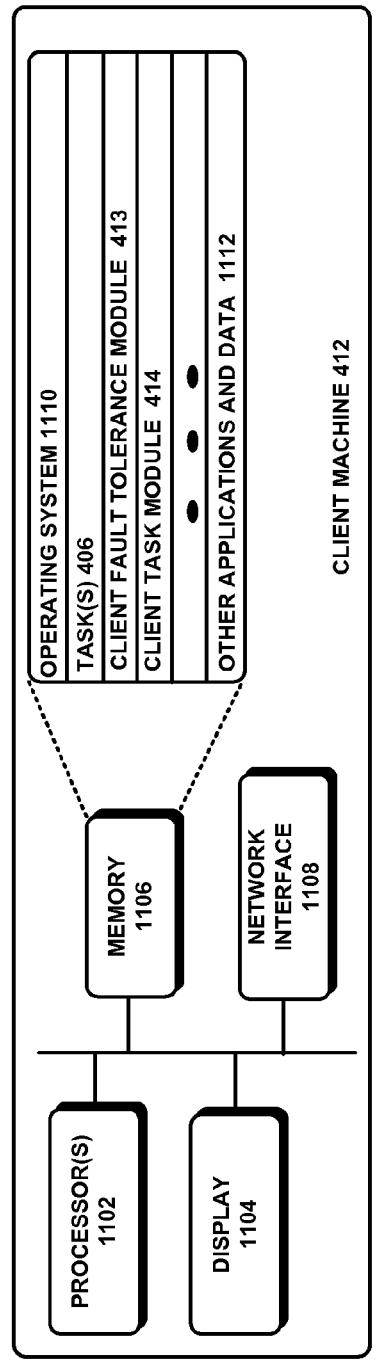
FIG. 11 is a block diagram illustrating an exemplary client machine.

FIG. 11 illustrates a block diagram of an exemplary client machine 412. A client machine 412 may embodied as a computing device having one or more processors 1102, a display 1104, a memory 1106, and a network interface 1108. A processor 1102 may be any commercially available processor and may include dual microprocessors and multi-processor architectures. The display 1104 may be any visual display unit and may include a display having a touch screen embedded within the display. The network interface 1108 facilitates wired or wireless communications between a client machine 412 and a communications framework.

The memory 1106 may be any computer-readable storage media that may store executable procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, flash memory drive, optical storage, DVD, CD, floppy disk drive, and the like. The memory 1106 may also include one or more external storage devices or remotely located storage devices. The memory may 1106 contain instructions and data as follows:

an operating system 1110;
    one or more tasks 406;
    a client fault tolerance module 413;
    a client task module 414; and
    various other applications and data 1112.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, the method comprising the steps of:
   accessing, by a first server, a first task list comprising tuples defining a plurality of tasks, each task of the plurality of tasks having a stage and a maximum stage;
   receiving a first request to execute a first task on a first client machine, the first task having a first estimated time of completion, a first stage, and a first maximum stage which indicates a maximum stage of execution that can be executed in parallel with the first task, wherein each task is associated with at least one task and each stage is associated with one or more tasks;
   determining that the first task may execute based on there not being another pending or currently running task having a stage less than the first stage and a maximum stage less than the first maximum stage;
   when there is not another pending or currently running task having a stage less than the first stage and a maximum stage less than the first maximum stage, responding to the first request by indicating that the first task may execute;
   when the first server does not receive communications from the first client machine within a predetermined time interval, identifying failure at the first client machine; and
   upon identifying a failure at the first client machine:
      waiting until a second request to execute a second task is received from a second client machine; and
      if there are no other pending or currently running tasks having a stage less than the stage associated with the second task and a maximum stage less than the maximum stage associated with the second task, allowing the second request to execute the second task.

2. The computer-implemented method of claim 1, further comprising:
   logging data pertaining to the failure upon identifying the failure.

3. The computer-implemented method of claim 1, wherein the first server operates as a stateless server.

4. The computer-implemented method of claim 1, further comprising:
   when the first server does not receive communications from any client machine within a predetermined time interval, identifying a network failure; and
   upon identifying a network failure:
      waiting until a third request to execute a third task is received from a third client machine; and
      if there are no other pending or currently running tasks having a stage less than the stage associated with the third task and a maximum stage less than the maximum stage associated with the third task, responding to the third request allowing the third request to execute the third task.

5. The computer-implemented method of claim 1, further comprising:
   when the first server does not receive communications from any client machine within a predetermined time interval, identifying a network failure; and
   upon identifying a network failure:
      waiting until a third request to execute a third task is received from a third client machine; and
      denying the third request to execute the third task.

6. The computer-implemented method of claim 1, further comprising:
   when the first server does not receive communications from the first client machine within a predetermined time interval, marking the first task as being completed.

7. The computer-implemented method of claim 1, further comprising:
   receiving a notification from the first client machine extending the first completion time; and
   setting the predetermined time interval as the extended first completion time.

8. The computer-implemented method of claim 1, further comprising:
   when the first server does not receive communications from the first client machine within a predetermined time interval, identifying failure at the first client machine; and
   upon identifying a failure at the first client machine:
      waiting until a second request to execute a second task is received from a second client machine; and
      responding to the second request denying the second request to execute the second task.

9. A device, comprising:
   at least one processor and at least one memory, the at least one memory including:
   a task list comprising tuples defining a plurality of tasks, each task of the plurality of tasks associated with a stage and a maximum stage; and
   at least one module having processor-executable instructions that when executed on the at least one processor:
   receives a first request to execute a first task on a first client machine, the first task associated with a first stage, a first expected completion time, and a first maximum stage which indicates a maximum stage of execution that can be executed in parallel with the first task, wherein each task is associated with at least one stage and each stage is associated with one or more tasks;
   determines that a first task may execute based on there not being a task currently running having a stage less than the first stage and a maximum stage less than the first maximum stage;
   identifies a failure on the first client machine when no further communications is received from the first client machine within a predetermined completion time; and
   upon identifying a failure at the first client machine:
      waiting until a second request to execute a second task is received from a second client machine; and
      suspending execution of the second task when the device operates in a conservative mode.

10. The device of claim 9, further comprising at least one module having processor-executable instructions that when executed on the at least one processor:
   when the first server does not receive communications from any client machine within a predetermined time interval, identifying a network failure; and
   upon identifying a network failure:
      waiting until a third request to execute a third task is received from a third client machine; and
      if there are no other pending or currently running tasks having a stage less than the stage associated with the third task and a maximum stage less than the maximum stage associated with the third task, responding to the third request allowing the third request to execute the third task.

11. The device of claim 9, further comprising at least one module having processor-executable instructions that when executed on the at least one processor:
   when the first server does not receive communications from any client machine within a predetermined time interval, identifying a network failure; and
   upon identifying a network failure:
      waiting until a third request to execute a third task is received from a third client machine; and
      denying the third request to execute the third task.

12. The device of claim 9, wherein the first server allows the second request to execute the second task if there are no other pending or currently running tasks having a stage less than the stage associated with the second task and a maximum stage less than the maximum stage associated with the second task when the device executes in best effort mode.

13. The device of claim 9, wherein the communications with the first client machine and the second client machine utilize a stateless communication session.

14. A system, comprising:
   at least one processor and at least one memory, the at least one memory comprising a task list and at least one module, the task list comprising tuples defining a plurality of tasks, each task of the plurality of tasks having a stage and a maximum stage, each stage uniquely represents an associated task in a numeric order of execution with respect to the plurality of tasks, the maximum stage indicating a maximum stage of execution that can be executed concurrently with an associated task; and
   the at least one module having processor-executable instructions that when executed on the at least one processor:
      receives a first request from a first client machine to execute a first task concurrently with at least one or more tasks of the plurality of tasks executing on one or more client machines, the first task associated with an expected completion time, a first stage and a first maximum stage;
      identifies a network failure when no communications are received from any client machine within a predetermined time interval;
      waits until a second request to execute a second task is received from a second client machine; and
      suspends execution of the second task when the device operates in a conservative mode.

15. The system of claim 14, wherein the at least one module includes further processor-executable instructions that when executed on the at least one processor:
   if there are no other pending or currently running tasks having a stage less than the stage associated with the second task and a maximum stage less than the maximum stage associated with the second task, allows the second task to execute when the system operates in best effort mode.

16. The system of claim 15, wherein the at least one module includes further processor-executable instructions that when executed on the at least one processor:
   marks the first task as completed.

17. The system of claim 14, wherein the at least one module includes further processor-executable instructions that when executed on the at least one processor:
   receives an updated expected completion time for the first task;
   upon receipt of a notification of completion of the first task at the updated expected completion time, marks the first task as completed.

\* \* \* \* \*